Figure 1:
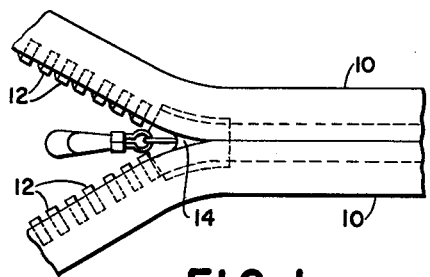

March 17, 1964      E. RYSER      3,124,871
METHOD OF MAKING COVERED SLIDE FASTENERS
Original Filed March 7, 1955      2 Sheets-Sheet 1

INVENTOR
Ernst Ryser

BY Holcombe, Wetherill & Brisebois
ATTORNEYS

March 17, 1964   E. RYSER   3,124,871
METHOD OF MAKING COVERED SLIDE FASTENERS
Original Filed March 7, 1955   2 Sheets-Sheet 2

INVENTOR
Ernst Ryser

BY Holcombe Witherill & Brisebois
ATTORNEYS

United States Patent Office 3,124,871
Patented Mar. 17, 1964

3,124,871
METHOD OF MAKING COVERED
SLIDE FASTENERS
Ernst Ryser, Via Turconi, Mendrisio, Tessin, Switzerland, assignor of one-half to Bertrand Voumard, La Chaux-de-Fonds, Switzerland
Original application Mar. 7, 1955, Ser. No. 492,607. Divided and this application Oct. 22, 1962, Ser. No. 242,338
Claims priority, application Switzerland Mar. 6, 1954
3 Claims. (Cl. 29—410)

This invention relates to a method of making covered sliding clamp fasteners.

This application is a division of application Serial No. 492,607, entitled Covered Slide Fasteners, filed March 7, 1955.

The usual method adopted for the manufacture of such fasteners is for the fastening elements to be prefabricated, by punching or analogous process, to U shape and then to be engaged over an edge of a strip of flexible material and to be tightened thereon by a pressing operation. There have also been proposals to cast the elements directly onto the strip by die-casting or injection moulding.

The usual sliding clasp fastener is visible when closed, a substantial part of each fastening element being exposed to view between the edges of the two strips when viewed from the front. There have been proposals for so forming the elements that they are substantially completely concealed by the strips when the fastener is closed but no commercial success appears to have been achieved in this connection and no proposal, whether of a practical or an academic nature, appears to have been made to produce an "invisible" fastener by casting the elements directly onto the strips.

In accordance with the invention a sliding clasp fastener is manufactured by casting each fastening element directly on the edge of a supporting strip so that its clasp portion covers a smaller width of strip than is covered on the opposite side, and deforming the portion of the fastening element on the latter side towards the central longitudinal plane so that the strip extends as far as that plane and thus covers that side of the clasp portion which would otherwise be visible when the fastener is closed.

The invention also extends to covered sliding clasp fasteners made by casting its elements directly onto the supporting strips, each strip being clamped between the clasp portion of an element and another portion which has a surface which supports the strip as far as the central longitudinal plane of the fastening and thus covers that side of the clasp portion which would otherwise be visible when the fastener is closed.

Figure 2:
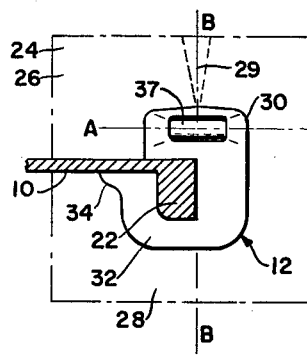
Figure 3:
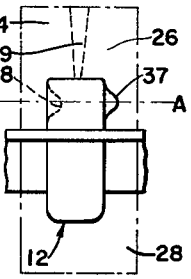
Figure 4:
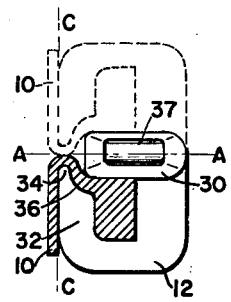
Figure 13:
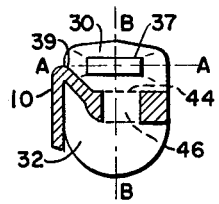
Figure 14:
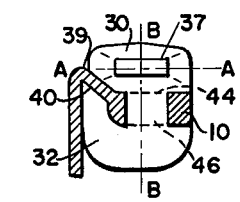
Figure 15:
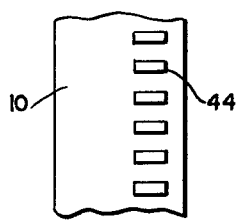

In order that the invention may be thoroughly understood, some examples in accordance with it will now be described with reference to the accompanying drawings in which:

FIGURE 1 shows a completed fastener;
FIGURE 2 shows the first stage in the manufacture of the fastener;
FIGURE 3 is an end view of the fastener element shown in FIGURE 2;
FIGURE 4 shows the fastener element of FIGURE 2 in its completed form;
FIGURES 5 and 6, 7 and 8 are views corresponding to FIGURES 2 and 4 of two modified forms of the invention;
FIGURES 9–14 show modified forms of fasteners in accordance with the invention; and
FIGURE 15 shows the supporting strip used in FIGURES 13 and 14.

FIGURE 1 shows part of a completed fastener. Elements 12 which are cast on to supporting strips 10 are drawn into engagement by the slider 14 so that when the elements are engaged the edges of the supporting strips are brought into the central longitudinal plane of the fastener thereby obscuring the elements.

Stages in the process of moulding or casting an element 12 on to the supporting strip are shown in FIGURES 2–4. The beaded edge 22 of a strip 10 is held in position by a mould, which has three parts 24, 26, 28, in a position such that the strip extends laterally through the side of the mould. The casting material is fed into the mould, through a passage 29 to form a U-shaped element 12 having two arms 30, 32 one on each side of the strip 10.

The arm 30 forms the clasp portion of the element, being formed with a projection 37 and a complementary depression 38 which, as is characteristic of sliding clasp fasteners, can be engaged with and disengaged from corresponding parts on neighbouring elements by means of the slider 14 (FIG. 1).

The arm 32 covers a greater part of the width of the strip 10 than does the arm 30 and terminates in a nose 34.

To complete the fastener element, the nose 34 is deformed towards the central longitudinal plane A—A of the fastener projection so that the strip 10 is carried as far as that plane and is clamped between the nose 34 and the edge 36 of the clasp portion 30 of the element. The deformation of the nose can be effected by any suitable means but is best effected by passing the strip through a roller press of conventional design.

FIGURE 4 shows the element 12 after deformation of the nose. It also shows in broken lines a second strip 10 carrying an element which is engaged with the element 12 as it would be when the fastener is closed. It will be seen that the two strips 10 completely cover the fastener elements so that when the fastener is closed, the elements are invisible from one side.

The method of manufacture described above is very simple and requires only simple equipment. In particular, the mould can be of simple and relatively inexpensive design.

The bead 22 of the supporting strip lies alongside the plane B—B passing through the centre of the clasp portion 38 on that side which will ultimately be the front side of the completed fastener. In order to prevent excessive angular displacement of the elements about the line at which the plane B—B intersects the central longitudinal plane A—A of the fastener, the distance between the plane B—B and the plane C—C (FIG. 4) in which the strip lies in the completed fastener should be made as small as possible.

Figure 5:
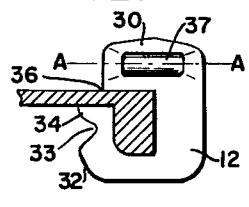
Figure 6:
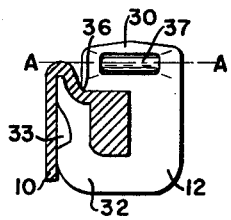
Figure 7:
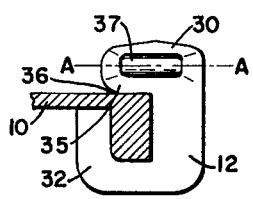
Figure 8:
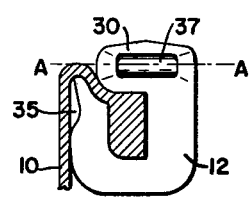

FIGURE 5 shows an element 12 produced by a casting or moulding operation similar to that described above in which a nose 34 is formed which does not project from the side of the element as in FIGURE 2 but is defined by a notch 33. The deformation of the nose 33 can be effected in the same manner as in the case of FIGURES 2–4.

It is not essential for the arm 32 to be cast with a projecting nose 34 as described above. It can be cast in the form shown in FIGURE 7 and then be deformed by a swaging operation into the position shown in FIGURE 8 so as to clamp the tape and carry it to the longitudinal central plane A—A. It will also be seen that the clasp portion 30 of the element is radiused at 35 instead of having a sharp edge as shown at 36 in FIGURES 2–6.

Alternative forms of fastening elements in accordance with the invention in which the supporting strip 10 is clamped between the clasp portion 30 and the arm 32 and is supported as fas as the central longitudinal plane A—A, are shown in FIGURES 9–12.

Figure 9:
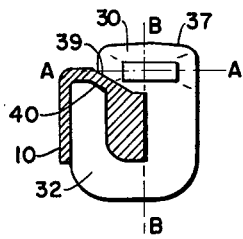
Figure 10:
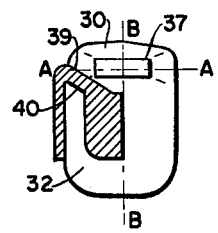
Figure 11:
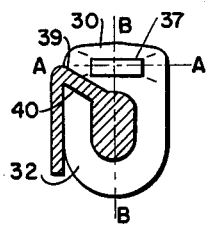
Figure 12:
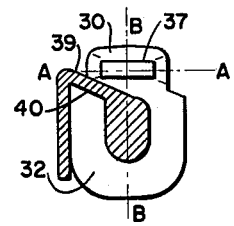

In these embodiments the arm 32 which supports the strip may project laterally beyond the clasp portion 38 as in FIGURES 9 and 12 or may be flush with the clasp portion as in FIGURES 10 and 11. Also the bead 22 may be disposed symmetrically with regard to the plane B—B which passes through the centre of the engaging parts of the clasp portion 38 as in FIGURES 11 and 12 or asymmetrically as in FIGURES 9 and 10.

In each of the arrangements shown in FIGURES 9–12, the two portions 30 and 32 of the element are provided with flat surfaces 39 and 40 between which the strip 10 is clamped. This is advantageous in comparison with FIGURES 4 and 6 in which the strip is clamped against an edge 36 but it has the disadvantage of complicating the mould.

The bead 22 at the edge of the strip 10 can have various shapes. Three different shapes are shown in FIGURES 2 and 5, FIGURES 9 and 10 and FIGURES 11 and 12. A still further shape is shown in FIGURES 13 and 14. The fastener shown in the latter figures are generally similar to those shown in FIGURES 10 and 9 but the strip 10 is perforated as shown in FIGURE 15. The casting material passes through the perforations 44 so that the two parts of the element are joined through the strip.

The fastening elements can be cast either on to a strip which can be sewn or otherwise fixed to a garment or can be cast directly on to the edge of a garment and the term "supporting strip" is to be construed accordingly.

The elements can be made of any of the usual materials used for that purpose, both metal and plastic. For example, metal elements can be made of zinc or of zinc base alloys such as those sold under the trade names Mazac and Zamac; plastic elements can be made of nylon, polystyrene, polyamine and other materials.

The supporting strips can be of textile material or of a plastic. In the latter event, plastic elements cast on to a strip can usefully be welded thereto by any of the usual welding methods.

I claim:

1. A method of manufacturing a sliding clasp fastener comprising casting each fastening element directly on to an edge of the supporting strip so that its clasp portion covers a smaller width of the strip than is covered on the opposite side, and deforming upwardly the end of the arm of the fastening element on the said opposite side towards the central longitudinal plane of the fastener projection so that the strip extends as far as that plane and thus covers that side of the clasp portion which would otherwise be visible when the fastener is closed.

2. A method according to claim 1 in which said opposite side of the fastening element to be deformed is cast with a lateral projecting nose to facilitate the deforming operation.

3. A method according to claim 2 in which the said opposite side is defined by a recess in the arm of the element.

References Cited in the file of this patent
UNITED STATES PATENTS 2,102,328    Morin et al. _____ Dec. 14, 1937
2,735,139    Morin _____ Feb. 21, 1956